United States Patent
Ning et al.

(10) Patent No.: US 9,518,819 B2
(45) Date of Patent: Dec. 13, 2016

(54) OPTICAL TESTING DEVICE

(71) Applicant: SHENZHEN CHINA STAR OPTOELECTRONICS TECHNOLOGY CO., LTD., Shenzhen, Guangdong (CN)

(72) Inventors: Chao Ning, Guangdong (CN); Sheng-Jer Chang Chien, Guangdong (CN)

(*) Notice: Subject to any disclaimer, the term of this patent is extended or adjusted under 35 U.S.C. 154(b) by 0 days.

(21) Appl. No.: 14/370,286

(22) PCT Filed: Sep. 23, 2013

(86) PCT No.: PCT/CN2013/084035
§ 371 (c)(1),
(2) Date: Jul. 2, 2014

(87) PCT Pub. No.: WO2015/018118
PCT Pub. Date: Feb. 12, 2015

(65) Prior Publication Data
US 2016/0153770 A1 Jun. 2, 2016

(30) Foreign Application Priority Data
Aug. 8, 2013 (CN) .......................... 2013 1 0344122

(51) Int. Cl.
*G01B 11/14* (2006.01)
*G01M 11/04* (2006.01)

(52) U.S. Cl.
CPC .............. *G01B 11/14* (2013.01); *G01M 11/04* (2013.01)

(58) Field of Classification Search
CPC ................................ G01B 11/14; G01B 11/04
USPC ......................................................... 356/614
See application file for complete search history.

(56) References Cited

U.S. PATENT DOCUMENTS 3,225,202 A * 12/1965 Rich, Jr. ................ B21B 38/00
250/349

FOREIGN PATENT DOCUMENTS

| CN | 1670587 A |   | 9/2005  |           |
|----|-----------|---|---------|-----------|
| CN | 201093353 Y |   | 7/2008  |           |
| CN | 101776517 | * | 7/2010  | G01M 11/04 |
| CN | 101776517 A |   | 7/2010  |           |
| CN | 102322601 A |   | 1/2012  |           |
| CN | 102607804 A |   | 7/2012  |           |
| CN | 202329991 | * | 7/2012  | G01M 11/04 |

(Continued)

OTHER PUBLICATIONS

Yuelan Hu, The International Searching Authority written comments, May 2014, CN.

(Continued)

*Primary Examiner* — Sunghee Y Gray

(57) ABSTRACT

The present invention discloses an optical testing device includes a base, a holder, and a number of illuminating modules. The base defines a sliding groove extending along a first direction in a top surface thereof. The holder slides along a second direction on the top surface of the base. The interval regulator is connected to the holder. The illuminating modules are slidably received in the sliding groove. Each of the illuminating modules comprises a circuit board and a single lighting element set on the circuit board. The interval regulator drives the holder to slide along a second direction so that a distance between the holder and the illuminating modules is regulated. The first direction is not parallel to the second direction.

7 Claims, 1 Drawing Sheet

(56) References Cited

FOREIGN PATENT DOCUMENTS

| | | | |
|---|---|---|---|
| CN | 202329991 U | 7/2012 | |
| CN | 202351018 * | 7/2012 | ............ G01N 11/04 |
| CN | 202351018 U | 7/2012 | |
| CN | 102628568 A | 8/2012 | |
| CN | 202631227 U | 12/2012 | |
| CN | 202702089 U | 1/2013 | |
| CN | 202793745 U | 3/2013 | |
| CN | 103017031 A | 4/2013 | |
| CN | 103062718 A | 4/2013 | |
| CN | 103217436 A | 7/2013 | |
| CN | 203084370 U | 7/2013 | |
| KR | 10-2006-0042647 A | 5/2006 | |

OTHER PUBLICATIONS

Qiao Zhong-Lian,Yang Dong-Sheng,Liu Fei,Design of Low Power LED Backlight Module for LCD TV,Aug. 2011,vol. 26, No. 4,Beijing BOE Chatani Electronics Co.ltd. ,Beijing,CN.

* cited by examiner

OPTICAL TESTING DEVICE

FIELD OF THE INVENTION

The invention relates to optical testing technologies, and particularly, to a optical testing device used to test optical properties of a backlight module.

BACKGROUND OF THE INVENTION

Generally, a liquid crystal display mostly uses a light bar having a number of evenly spaced light emitting diode (LED) as a backlight. A huge number of light bars with different intervals of two LEDs needs to be manufactured in order to reduce the number of LEDs and decrease the distance between the light bar and the light guide plate under a condition that uneven brightness of backlight due to a gap between two LEDs can sanctify a predetermined quality requirement, which leads to a high testing cost and is not easy to find out a maximum critical value of LED interval. Otherwise, the distance between the light bar and the light guide plate would be changed when the light bar is replaced. It is difficult to make sure a precision of the distance even if a measuring instrument is used to regulate the distance.

Therefore, an optical testing device which can solve the above-mentioned problem needs to be provided.

SUMMARY OF THE INVENTION

To solve the above-mentioned problem, the present invention provides an optical testing device includes a base, a holder, and a number of illuminating modules. The base defines a sliding groove extending along a first direction in a top surface thereof. The holder slides along a second direction on the top surface of the base. The interval regulator is connected to the holder. The illuminating modules are slidably received in the sliding groove. Each of the illuminating modules comprises a circuit board and a single lighting element set on the circuit board. The interval regulator drives the holder to slide along a second direction so that a distance between the holder and the illuminating modules is regulated. The first direction is not parallel to the second direction.

Wherein, the base defines a sliding rail extending along the second direction in the top surface thereof. The holder includes a holding surface, a connecting surface, and a sliding block formed on the connecting surface corresponding to the sliding rail. The holder is slidably connected to the sliding rail via the sliding block.

Wherein, the interval regulator is set on the top surface of the base. The interval regulator includes a substrate and a driving rod on the substrate. The driving rod telescopically extends along the second direction. A distal end of the driving rod is connected to the holder to drive the holder to slide.

Wherein, there is a calibration is formed on the driving rod to precisely regulate a sliding distance of the holder.

Wherein, the holder includes a first periphery closing the sliding groove and a second periphery opposite to the first periphery. The interval regulator is set on the base and located at a side close the second periphery. The distal end of the driving rod is connected to the second periphery.

Wherein, the interval regulator is a micrometer.

Wherein, the sliding groove has a predetermined width along a direction perpendicular to a top surface of the base. The illuminating module slides along the width direction of the sliding groove in a predetermined range.

Wherein, the optical testing device further includes a height regulator set above the sliding groove along a direction perpendicular to the top surface of the base. The height regulator includes a driving pole telescopically extending along the width direction of the sliding groove, and a distal end of the height regulator is connected to the illuminating modules to regulate a height of the illuminating modules along the width direction of the sliding groove.

Wherein, the optical testing device further comprises a plurality of spacers inserted a gap between two adjacent illuminating modules. The spacers are used to precisely regulate an interval between each two adjacent illuminating modules.

Wherein, the sliding groove has a calibration along the first direction to regulate the position of the illuminating modules in the sliding groove.

Wherein, the first direction is perpendicular to the second direction.

The optical testing device provided by this invention employs a number of slideable single lighting elements and the slidably regulated holder to hold a light guide plate and a number of optical films, which is very convenient to increase or decrease the illuminating modules. Thus, the testing efficiency of optical properties is improved and the testing cost is cut down.

BRIEF DESCRIPTION OF THE DRAWINGS

In order to illustrate technical schemes of the present invention or the prior art more clearly, the following section briefly introduces drawings used to describe the embodiments and prior art. Obviously, the drawing in the following descriptions just is some embodiments of the present invention. The ordinary person in the related art can acquire the other drawings according to these drawings without offering creative effort.

DETAILED DESCRIPTION OF PREFERRED EMBODIMENTS

The following sections offer a clear, complete description of the present invention in combination with the embodiments and accompanying drawings. Obviously, the embodiments described herein are only a part of, but not all of the embodiments of the present invention. In view of the embodiments described herein, any other embodiment obtained by the person skilled in the field without offering creative effort is included in a scope claimed by the present invention.

Figure 1:
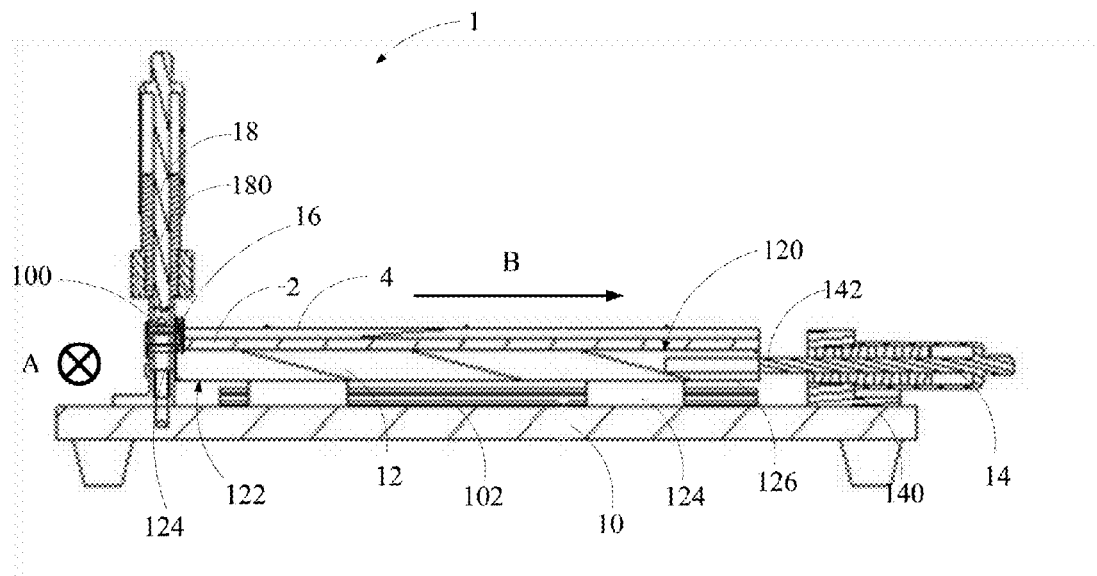
FIG. 1 is a schematic structural view of an optical testing device in accordance with an embodiment of the present invention.
Figure 2:
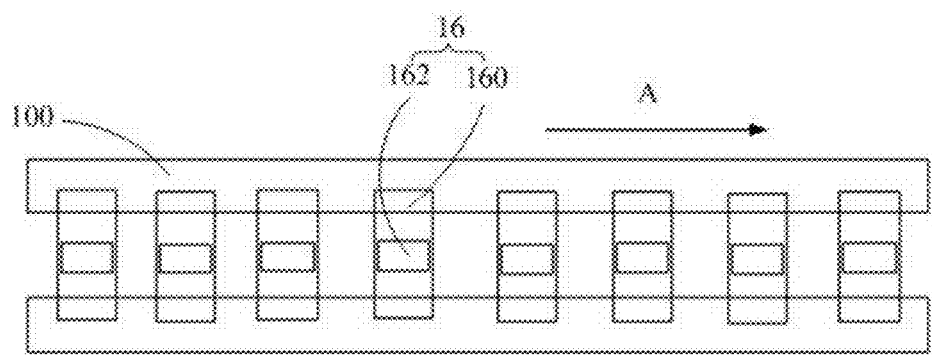
FIG. 2 is a sliding groove and a number of illuminating modules of FIG. 1.

Referring to FIGS. 1 and 2, an optical testing device 1 in accordance with an embodiment of the present invention includes a base 10, a holder 12, an interval regulator 14, and a number of illuminating modules 16. Each of the illuminating modules 16 includes a circuit board 160 and a single lighting element 162 set on the circuit board 160. The base 10 defines a sliding groove 100 extending along a first direction A. The illuminating modules 16 are slidably received in the sliding groove 100. The holder 12 slides along a second direction B on the base 10. The interval regulator 14 drives the holder 12 to slide along the second direction B and regulates a distance between the holder and the illuminators in the sliding groove 100. The first direction A is not parallel to the second direction B. In this embodiment, the light element is a light emitting diode (LED). The first direction A is perpendicular to the second direction B.

The base 10 defines a sliding rail 102 extending along the second direction B in a top surface thereof. The holder 12 includes a holding surface 120, a connecting surface 122, and a sliding block 124 formed on the connecting surface 122 corresponding to the sliding rail 102. The holder 12 is slidably connected to the sliding rail 102 via the sliding block 124. In this embodiment, the holder 12 is a thin flat plate. The holding surface 120 and the connecting surface 122 are defined along a thickness direction of the holder 12. The holding surface 120 is a flat surface.

The interval regulator 14 is set on the top surface of the base 10. The interval regulator 14 includes a substrate 140 and a driving rod 142 on the substrate 140. The driving rod 142 telescopically extends along the second direction B. A distal end of the driving rod 142 is connected to the holder 12 to drive the holder 12 to slide. There is a calibration is formed on the driving rod 142 to precisely regulate a sliding distance of the holder 12. The holder 12 includes a first periphery 125 closing the sliding groove 100 and a second periphery 126 opposite to the first periphery 126. In this embodiment, the interval regulator 14 is set on the base 10 and located at a side close the second periphery 126. The distal end of the driving rod 142 is connected to the second periphery 126. The interval regulator 14 is a micrometer.

The sliding groove 100 has a predetermined width along a direction perpendicular to a top surface of the base 10. The illuminating module 16 slides along the width direction of the sliding groove 100 in a predetermined range. The optical testing device further includes a height regulator 18. The height regulator 18 is set above the sliding groove 100 along a direction perpendicular to the top surface of the base 10. The height regulator 18 includes a driving pole 180 telescopically extending along the width direction of the sliding groove 100. A distal end of the height regulator 18 is connected to the illuminating modules 16 to regulate a height of the illuminating modules 16 along the width direction of the sliding groove 100. The optical testing device further includes a number of spacers 19. The spacers 19 are inserted a gap between two adjacent illuminating module 16 to precisely regulate an interval between each two adjacent illuminating modules 16. It is understood that, in the other alternating embodiment, the sliding groove 100 has a calibration along the first direction A to regulate the position of the illuminating modules in the sliding groove 100.

During the test, a light guide plate 2 is put on the holding surface 120 of the holder 12. The light guide plate 2 includes a number of optical films 4 set on an upper surface of the light guide plate 2. The interval regulator 14 drives the holder 12 along the second direction B to regulate the distance between the light guide plate 2 and the illuminating modules 16 in the sliding groove 100 to a predetermined light coupling distance. The illuminating modules 16 slides in the sliding groove 100 along the first direction A to regulate the distance between each two illuminators to a predetermined interval. The height of the illuminating modules 16 along the width direction of the sliding groove 100 are regulated by the height regulator 18 in order to align the light output surface with the incident surface of the light guide plate 2. At last, the illuminating modules are lightened to test the optical properties of backlight in this light coupling distance and the interval of the illuminating modules 16. If the light coupling distance and the interval of the illuminating modules 16 needs to be changed, only regulate the interval regulator 16 and slide the illuminating modules 16 along the sliding groove 100. It is very convenient to increase or decrease the illuminating modules 16. Thus, the testing efficiency of optical properties is improved and the testing cost is cut down.

What is said above are only preferred examples of present invention, not intended to limit the present invention, any modifications, equivalent substitutions and improvements etc. made within the spirit and principle of the present invention, should be included in the protection range of the present invention.

What is claimed is:

1. An optical testing device comprising:
   a base defining a sliding groove extending along a first direction in a top surface thereof;
   a holder sliding along a second direction on the top surface of the base;
   an interval regulator connected to the holder; and
   a plurality of illuminating modules slidably received in the sliding groove;
   wherein each of the illuminating modules comprises a circuit board and a single lighting element set on the circuit board, the interval regulator drives the holder to slide along a second direction so that a distance between the holder and the illuminating modules is regulated, and the first direction is not parallel to the second direction, wherein the sliding groove has a predetermined width along a direction perpendicular to a top surface of the base, and the illuminating module slides along the width direction of the sliding groove in a predetermined range;
   a height regulator set above the sliding groove along a direction perpendicular to the top surface of the base, wherein the height regulator comprises a driving pole telescopically extending along the width direction of the sliding groove, and a distal end of the height regulator is connected to the illuminating modules to regulate a height of the illuminating modules along the width direction of the sliding groove.

2. The optical testing device of claim 1, wherein the base defines a sliding rail extending along the second direction in the top surface thereof, the holder comprises a holding surface, a connecting surface, and a sliding block formed on the connecting surface corresponding to the sliding rail, and the holder is slidably connected to the sliding rail via the sliding block.

3. The optical testing device of claim 1, wherein the interval regulator is set on the top surface of the base, the interval regulator comprises a substrate and a driving rod on the substrate, the driving rod telescopically extends along the second direction, and a distal end of the driving rod is connected to the holder to drive the holder to slide.

4. The optical testing device of claim 3, wherein the holder comprises a first periphery closing the sliding groove and a second periphery opposite to the first periphery, the interval regulator is set on the base and located at a side close the second periphery, and the distal end of the driving rod is connected to the second periphery.

5. The optical testing device of claim 1, wherein the interval regulator is a micrometer.

6. The optical testing device of claim 1, the optical testing device further comprising a plurality of spacers inserted a gap between two adjacent illuminating modules, wherein the spacers are used to precisely regulate an interval between each two adjacent illuminating modules.

7. The optical testing device of claim 1, wherein the first direction is perpendicular to the second direction.

* * * * *